United States Patent
Liu et al.

(10) Patent No.: US 9,351,170 B2
(45) Date of Patent: May 24, 2016

(54) RENEWABLE ENERGY BASE STATION AND COVERAGE ADJUSTMENT METHOD THEREFOR, AND WIRELESS CELLULAR SYSTEM

(71) Applicant: HITACHI, LTD., Tokyo (JP)

(72) Inventors: Chunguang Liu, Beijing (CN); Peng Yang, Beijing (CN); Jie Gong, Beijing (CN); Sheng Zhou, Beijing (CN); Mika Mizutani, Beijing (CN); Zhisheng Niu, Beijing (CN)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 14/197,713

(22) Filed: Mar. 5, 2014

(65) Prior Publication Data
US 2014/0256330 A1 Sep. 11, 2014

(30) Foreign Application Priority Data
Mar. 11, 2013 (CN) .......................... 2013 1 0075703

(51) Int. Cl.
*H04W 88/08* (2009.01)
*H04W 16/08* (2009.01)
*H04W 52/02* (2009.01)

(52) U.S. Cl.
CPC .......... *H04W 16/08* (2013.01); *H04W 52/0206* (2013.01); *H04W 52/0277* (2013.01); *H04W 88/08* (2013.01); *Y02B 60/50* (2013.01)

(58) Field of Classification Search
CPC ... H04W 88/08; H04W 88/085; H04W 16/24; H01Q 1/246
See application file for complete search history.

(56) References Cited

U.S. PATENT DOCUMENTS

| | | | |
|---|---|---|---|
| 6,366,774 B1 * | 4/2002 | Ketonen ................ | H04W 52/52 370/216 |
| 7,715,353 B2 | 5/2010 | Jain et al. | |
| 8,023,951 B2 | 9/2011 | Mattila | |
| 8,831,672 B2 * | 9/2014 | Frenger ............ | H04W 52/0206 307/66 |
| 2009/0154384 A1 * | 6/2009 | Todd et al. .................... | 370/311 |
| 2011/0021186 A1 * | 1/2011 | Fischer .................. | H01Q 1/246 455/424 |
| 2012/0057514 A1 | 3/2012 | Todd et al. | |
| 2012/0252525 A1 * | 10/2012 | Frenger ............ | H04W 52/0206 455/524 |

* cited by examiner

Primary Examiner — Matthew Sams
(74) Attorney, Agent, or Firm — Mattingly & Malur, PC (57) ABSTRACT

It is provided a renewable energy base station, which is used in a wireless cellular system, including: an adjustment request determining part for determining whether an adjustment to a coverage area is required; an adjustment request transceiver in case where it is determined that the adjustment to the coverage area is required, sending a coverage area adjustment request to neighboring base stations in the wireless cellular system, and receiving an adjustment request response from the neighboring base stations; an adjustment request responding part for determining whether the coverage area adjustment request from the one of the neighboring base stations is allowed in case where receiving the coverage area adjustment request from one of the neighboring base stations; and a response transmitter for sending the adjustment request response to the neighboring base stations based on a result of the determination made by the adjustment request responding part.

14 Claims, 8 Drawing Sheets

RENEWABLE ENERGY BASE STATION AND COVERAGE ADJUSTMENT METHOD THEREFOR, AND WIRELESS CELLULAR SYSTEM

CLAIM OF PRIORITY

The present application claims priority from Chinese patent application No. 201310075703.6 filed on Mar. 11, 2013, the content of which is hereby incorporated by reference into this application.

BACKGROUND OF THE INVENTION

This invention relates to a renewable energy base station and a coverage adjustment method therefor, and a wireless cellular system including the renewable energy base station.

In a wireless cellular system including a plurality of base stations, as a way to reduce the energy consumption of the base station, there has been proposed a technology to adjust the coverage area of the base station (also referred to as "cell zooming"), adjusting the base station coverage area in accordance with the traffic variation and the user quality of service (QoS) requirement.

Adjustment to the coverage area of the base station is usually achieved by adjusting the transmitting power of the base station. When it is assumed that the user is always connected to the base station having the strongest signal, adjusting the transmitting power can then change the user's connection condition. When a base station detects that the outage probability of the base station is relatively high, the base station reduces the transmitting power, and requests its neighboring base station(s) to enhance the power in order to share the load pressure or the energy consumption pressure, until the outage probability is less than a given threshold value.

In recent years, renewable energy base stations utilizing solar and wind energies have been increasingly used in wireless cellular systems. Compared with the previous ordinary base station, the renewable energy base station has a renewable energy power supply system. Take a renewable energy base station utilizing the solar energy as an example, the renewable energy power supply system in the base station collects the solar energy through solar cell arrays and solar charge controllers, and stores the collected energy into a storage battery, and further supplies power to the main body of the base station through the storage battery. In addition, the renewable energy base station commonly used can be supplied with power by the power grid like the ordinary base station, but in order to save energy consumption, the renewable energy base station preferably uses the electric power stored in the storage battery. Only when the electric power of the storage battery is insufficient to meet the user requirement, the power grid is enabled to supply the commercial power for the supplement.

However, because power generation utilizing the solar and wind energies is unsustainable, the energy condition of the renewable energy base station may not necessarily be stable. Take the solar energy as an example, when the sunlight beats down directly, the rate of collecting the energy is relatively high, and the electric power of the storage battery can be maintained at a relatively high level. When the sunlight is blocked due to a weather condition, however, the rate of collecting the energy is low, and the electric power of the storage battery may be in a relatively low state.

Based on the above-mentioned characteristics of the energy state of the renewable energy base station, it is not enough to only consider as usual the outside factors of the base station, such as the traffic variation and the user QoS requirement, in adjusting the coverage area of the base station in the wireless cellular system, but the energy state of the renewable energy base station (i.e. the electric power of the storage battery) also needs to be taken into consideration.

SUMMARY OF THE INVENTION

In order to solve the above-mentioned problems, an object of this invention is to provide a renewable energy base station and a coverage adjustment method therefor, and a wireless cellular system including the renewable energy base station, which are capable of adjusting a coverage area of the base station by taking into consideration an energy state of the renewable energy base station, improving a utilization rate of the renewable energy in a wireless cellular system, and reducing an energy consumption of the whole wireless cellular system.

In order to achieve the above-mentioned object, according to one embodiment of this invention, there is provided a renewable energy base station, which is used in a wireless cellular system, including: an adjustment request determining part for determining whether an adjustment to a coverage area of the renewable energy base station is required based on at least one of network resource usage information of the renewable energy base station and storage battery electric power information of the renewable energy base station; an adjustment request transceiver in case where it is determined that the adjustment to the coverage area of the renewable energy base station is required, sending a coverage area adjustment request to neighboring base stations in the wireless cellular system, and receiving an adjustment request response from the neighboring base stations; an adjustment request responding part for determining whether the coverage area adjustment request from the one of the neighboring base stations is allowed based on at least one of the network resource usage information and the storage battery electric power information of the renewable energy base station in case where receiving the coverage area adjustment request from one of the neighboring base stations; and a response transmitter for sending the adjustment request response to each of the neighboring base stations based on a result of the determination made by the adjustment request responding part.

Further, according to one embodiment of this invention, there is provided a coverage adjustment method for a renewable energy base station, which is performed in a wireless cellular system including a renewable energy base station, the coverage adjustment method including: an adjustment request determining step of determining, by the renewable energy base station, whether an adjustment to a coverage area of the renewable energy base station is required based on at least one of network resource usage information of the renewable energy base station and storage battery electric power information of the renewable energy base station; an adjustment request receiving and sending step of in case where it is determined that the adjustment to the coverage area of the renewable energy base station, the renewable energy base station sending a coverage area adjustment request to neighboring base stations in the wireless cellular system and receiving an adjustment request response from the neighboring base stations; an adjustment processing determining step of determining, by the renewable energy base station, whether the coverage area is able to adjust based on the adjustment request response from the each of the neighboring base stations; and an adjustment processing step of determining, by the renewable energy base station, in case where it is determined that the coverage area is able to adjust, at least one of an adjustment amount to the coverage area of the renewable energy base station and an adjustment amount to the coverage area of the neighboring base stations, and collaborating with the neighboring base stations to perform adjustment processing to the coverage areas.

Further, according to one embodiment of this invention, there is provided a wireless cellular system, including a renewable energy base station and neighboring base stations adjacent to the renewable energy base station, which use renewable energy, the renewable energy base station including: an adjustment request determining part for determining whether an adjustment to a coverage area of the renewable energy base station is required based on at least one of network resource usage information of the renewable energy base station and storage battery electric power information of the renewable energy base station; and an adjustment request transceiver for in case where it is determined that the adjustment to the coverage area of the renewable energy base station is required, sending a coverage area adjustment request to each of neighboring base stations in the wireless cellular system, and receiving an adjustment request response from the neighboring base stations, the each of the neighboring base stations including: an adjustment request responding part for determining whether the coverage area adjustment request from the renewable energy base station is allowed based on at least one of the network resource usage information of the neighboring base stations and the storage battery electric power information of the each of the neighboring base stations; and a response transmitter for sending the adjustment request response to the renewable energy base station based on a result of the determination made by the adjustment request responding part.

According to the renewable energy base station, the coverage adjustment method for a renewable energy base station, and the wireless cellular system including the renewable energy base station, because the adjustment to the coverage area of the base station takes into consideration the energy state of the renewable energy base station, the utilization rate of the renewable energy in the wireless cellular system is improved, thereby the energy consumption of the whole wireless cellular system is reduced.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Firstly, a meaning of an outage probability of a renewable energy base station and a calculation method therefor are described.

The outage probability (outage) of a base station is defined as a statistical probability that a user quality of service (QoS) is not met in the coverage area of the base station. The outage occurs generally because, under the condition of a given frequency band of a base station, the user quality of service requirement exceeds the service capacity of the base station. In case where a renewable energy base station has insufficient energy, the renewable energy base station closes a part of the frequency band, resulting in a decrease of the service capacity of the renewable energy base station. The energy of the renewable energy base station therefore also becomes a factor contributing to the occurrence of the outage. That is to say, for a renewable energy base station, the outage may occur due to overloading or insufficient energy, and hence the outage probability is a function based on load and energy.

For example, in the case of a given service rate (bandwidth) requirement, the outage probability of the renewable energy base station can be calculated by the following equation (1).

$$Pout=Pr(r<r0)=1-(1-Pr(r<r0|Pt))Pr(Pt) \quad (1)$$

In this equation, Pout represents the outage probability of the renewable energy base station, $Pr(r<r0|Pt)$ represents the probability that a service rate r0 cannot met the requirement under the condition of a given power Pt, and $Pr(Pt)$ represents the probability that the power requirement Pt can be met.

Figure 1:
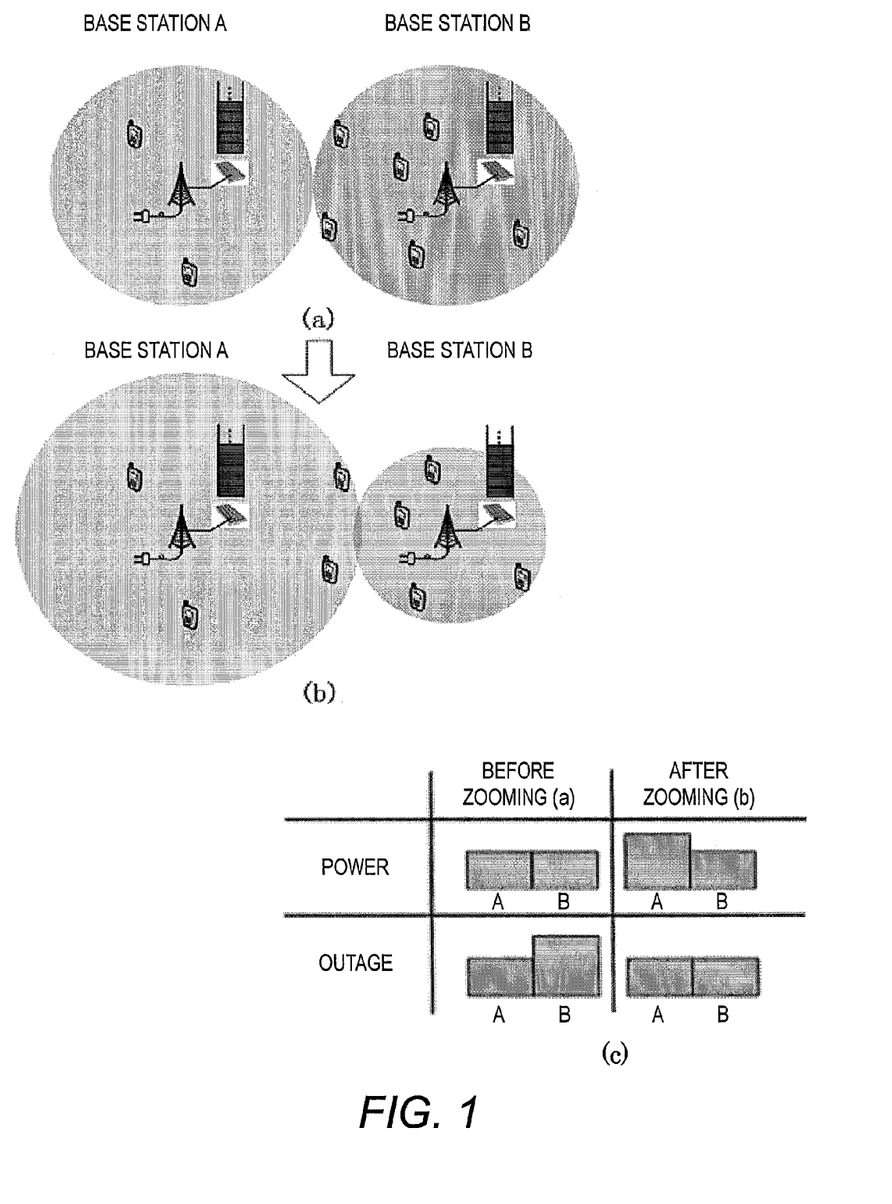
FIG. 1 is an explanatory diagram illustrating a principle of adjustment to the coverage area of a base station according to a first embodiment of this invention.

FIG. 1 is an explanatory diagram illustrating the principle of adjustment to the coverage area of the base station according to a first embodiment of this invention. FIG. 1(a) illustrates the state before the adjustment to the coverage areas of the base stations, FIG. 1(b) illustrates the state after the adjustment to the coverage areas of the base stations, and FIG. 1(c) illustrates the transmitting powers and outage probabilities of the base stations before and after the adjustment to the coverage areas.

FIG. 1(a) illustrates a wireless cellular system including a renewable energy base station A (may also be referred to simply as "base station A") and a renewable energy base station B (may also be referred to simply as "base station B"). In addition, the renewable energy base station in this invention is described by taking a base station utilizing the solar energy as an example.

As illustrated in FIG. 1(a), the storage batteries of the base station A and the base station B are in a state of high level electric quantities, and therefore the adjustment to the coverage area of the base station at this time needs not to take into consideration the factor of the electric power of the storage battery, but only to take into consideration the load factor. That is to say, the principle of adjustment to the coverage area of the base station in this case is basically the same as that of the ordinary base stations that do not utilize any renewable energy.

In FIG. 1(a), there are two wireless devices accessing to the coverage area of the base station A, and there are six wireless devices accessing to the coverage area of the base station B. At this time, the load of the base station A is lighter than that of the base station B.

In order to make the network flow evenly-distributed and reduce the outage probability of the base station, the coverage area of the base station B with a heavy load is decreased, and the coverage area of the base station A with a light load is increased, so as to balance the load. As illustrated in FIG. 1(b), after the adjustment to the coverage area of the base station, there are four wireless devices accessing to the coverage area of the base station A, and there are four wireless devices accessing to the coverage area of the base station B, too. That is to say, the base station. A accepts two wireless devices transferred from the coverage area of the base station B.

Further, as illustrated in FIG. 1(c), before the adjustment to the coverage areas of the base stations, the coverage areas of the base station A and the base station B are the same and the transmitting powers (powers) of the base station A and the base station B are also the same, but because the number of the wireless devices accessing to the base station B is higher and the load is heavier, the outage probability (outage) of the base station B is larger than that of the base station A. In contrast, after the adjustment to the coverage areas of the base stations, although the coverage area of the base station A is increased and the coverage area of the base station B is decreased and correspondingly the transmitting power of the base station A is strengthened and the transmitting power of the base station B is weakened. Thus, since the numbers of the wireless devices accessing to the base station A and the base station B both become four, causing the same load, and the electric quantities of the storage batteries are sufficient, the outage probabilities of the base station A and the base station B are the same, and moreover, the base station A and the base station B both can meet the qualities of services in the coverage areas.

Figure 2:
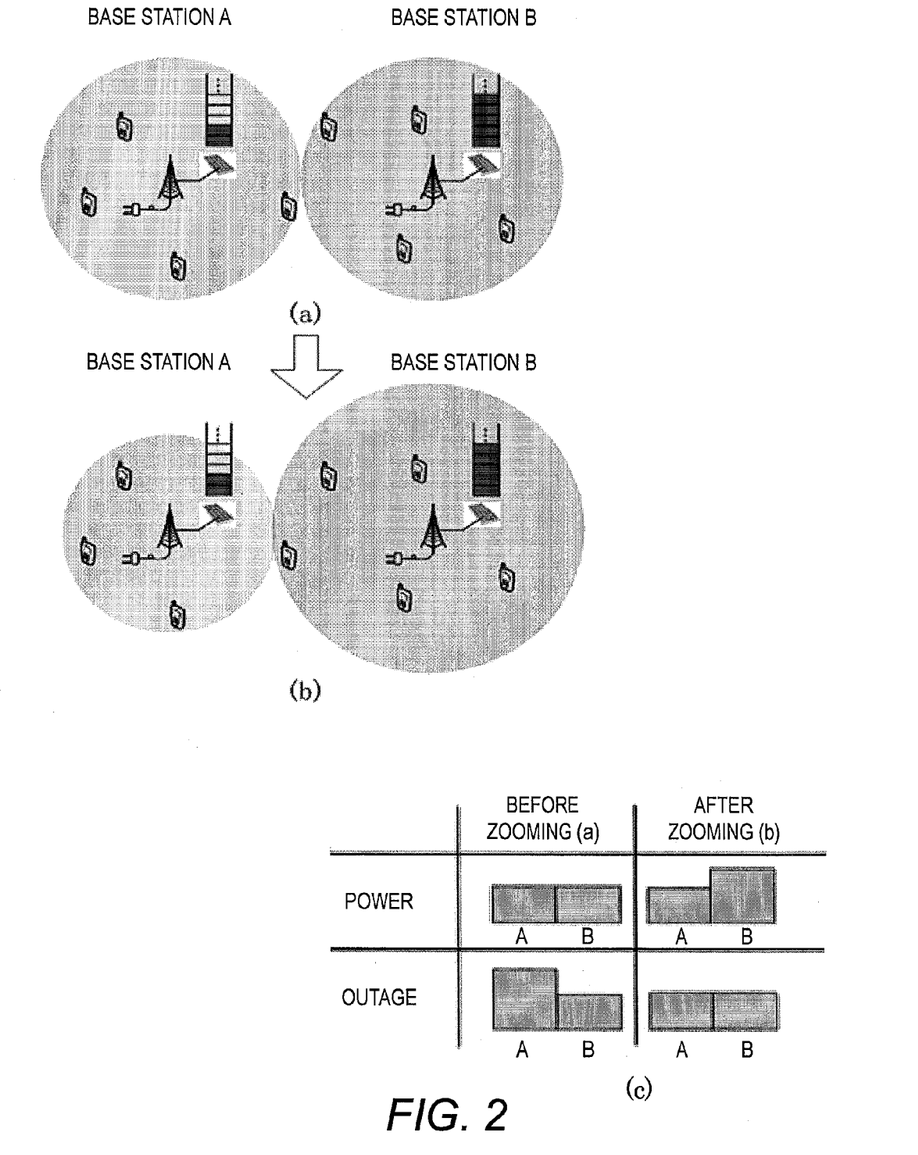
FIG. 2 is an explanatory diagram illustrating a principle of adjustment to the coverage area of the base station according to a second embodiment of this invention.

FIG. 2 is an explanatory diagrams illustrating the principle of adjustment to the coverage area of the base station according to a second embodiment of this invention. FIG. 2(a) illustrates the state before the adjustment to the coverage area of the base station, FIG. 2(b) illustrates the state after the adjustment to the coverage areas of the base stations, and FIG. 2(c) illustrates the transmitting powers and outage probabilities of the base stations before and after the adjustment to the coverage areas.

As illustrated in FIG. 2(a), there are four wireless devices accessing to the coverage area of the base station A, and there are four wireless devices accessing to the coverage area of the base station B. At this time, the load of the base station A and the base station B are the same and the storage battery of the base station B is in a state of high level electric power, but the storage battery of the base station A is in a state of low level electric power. The adjustment to the coverage areas of the base stations at this time therefore needs to take into consideration not only the load factor, but also the factor of the electric power of the storage battery.

In order to better utilize the electric power of the storage battery to achieve the purpose of energy saving of the whole system, the coverage area of the base station A with insufficient electric power of the storage battery is decreased, and the coverage area of the base station B with sufficient electric power of the storage battery is increased. As illustrated in FIG. 2(b), after the adjustment to the coverage areas of the base stations, there are three wireless devices accessing to the coverage area of the base station A, and there are five wireless devices accessing to the coverage area of the base station B. That is to say, the base station B accepts one wireless device transferred from the coverage area of the base station A.

Further, as illustrated in FIG. 2(c), before the adjustment to the coverage areas of the base stations, the coverage areas of the base station A and the base station B are the same and the transmitting powers of the base station A and the base station B are also the same, but because the electric power of the storage battery of the base station A is insufficient, the outage probability of the base station A is higher than that of the base station B. In contrast, after the adjustment to the coverage areas of the base stations, although the coverage area of the base station A is decreased and the coverage area of the base station B is increased and correspondingly the transmitting power of the base station A is weakened and the transmitting power of the base station B is strengthened, the number of the wireless devices accessing to the base station A is correspondingly decreased to three, and the number of the wireless devices accessing to the base station B is correspondingly increased to five. As a result, the number of the wireless devices accessing to the base station A with weaker transmitting power is low, the number of the wireless devices accessing to the base station B with stronger transmitting power is high, and by combining the variable factors in two aspects of the transmitting powers and the loads, it can be achieved that the outage probabilities of the base station A and the base station B are basically the same, and moreover, the base station A and the base station B both can meet the qualities of services in the coverage areas.

Figure 3:
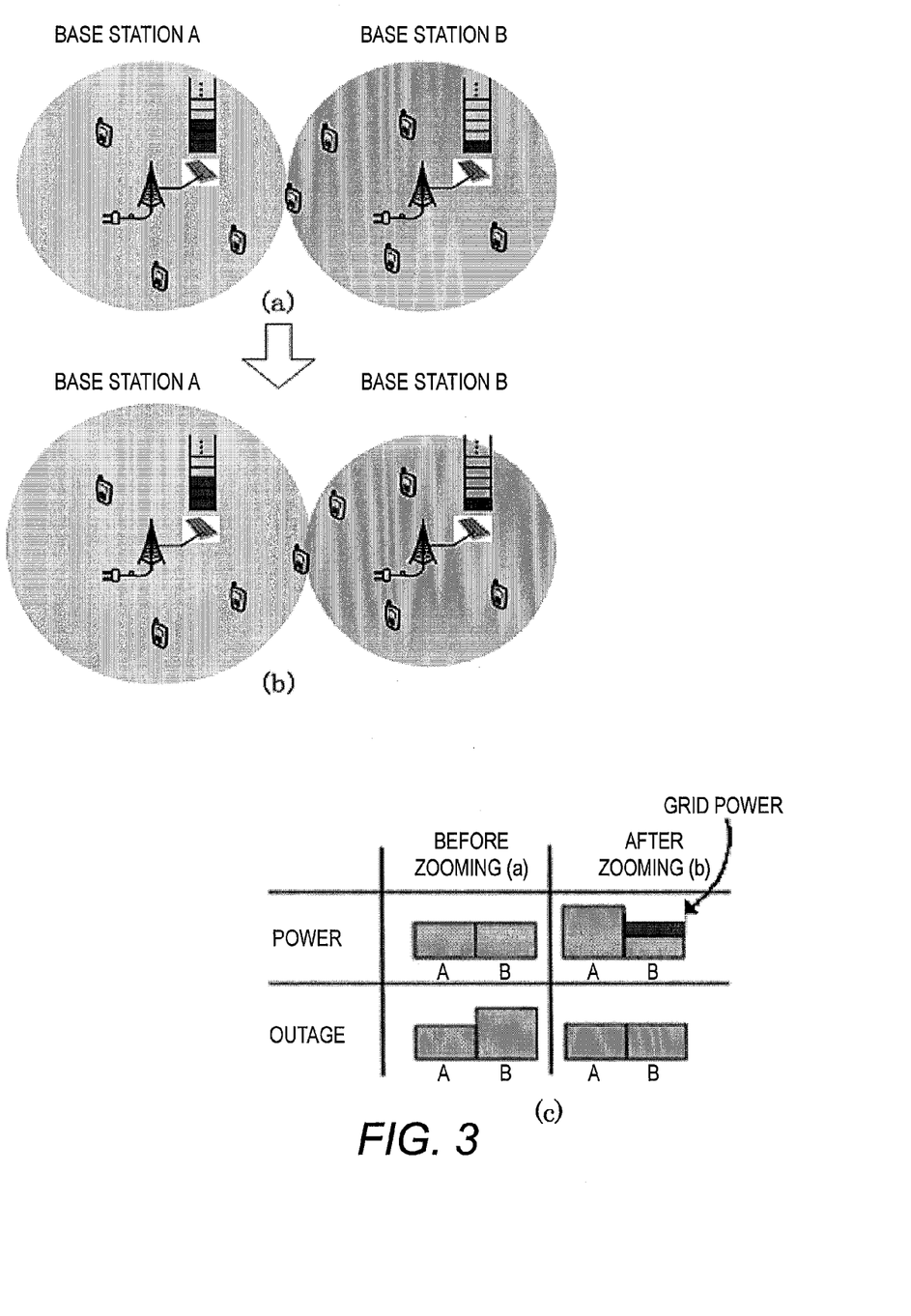
FIG. 3 is an explanatory diagram illustrating a principle of adjustment to the base station according to a third embodiment of this invention.

FIG. 3 is an explanatory diagrams illustrating the principle of adjustment to the coverage area of the base station according to a third embodiment of this invention. FIG. 3(a) illustrates the state before the adjustment to the coverage area of the base station, FIG. 3(b) illustrates the state after the adjustment to the coverage area of the base station, and FIG. 3(c) illustrates the transmitting powers and the outage probabilities of the base stations before and after the adjustment to the coverage areas.

As illustrated in FIG. 3(a), before the adjustment to the coverage areas of the base stations, there are three wireless devices accessing to the coverage area of the base station A, and there are five wireless devices accessing to the coverage area of the base station B. At this time, the load of the base station B is relatively heavy. As to the aspect of the electric power of the storage battery, the storage battery of the base station B is in a state of low level electric power, and at the same time, the storage battery of the base station A is in a state of limited level electric power (a state between the high level electric power and the low level electric power).

Therefore, although the load of the base station B is relatively heavy, the base station A cannot completely accept the wireless device(s) transferred from the base station B because the electric power of the base station A is limited. The adjustment to the coverage areas of the base stations is therefore controlled to increase appropriately the coverage area of the base station A, and at the same time to enable the power grid to supply power to the base station B, so as to ensure that the outage probability of the base station A is not too low.

As illustrated in FIG. 3(b), after the adjustment to the coverage areas of the base stations, the coverage area of the base station A is appropriately increased, where there are four wireless devices accessing, and the coverage area of the base station B is appropriately decreased, where there are four wireless devices accessing. That is to say, the base station A accepts one wireless device transferred from the coverage area of the base station B.

Further, as illustrated in FIG. 3(c), before the adjustment to the coverage areas of the base stations, the coverage areas of the base station A and the base station B are the same and the transmitting powers (powers) of the base station A and the base station B are also the same, but because the number of the wireless devices accessing to the base station B is large, causing the heavy load, and the storage battery of the base station B has less electric power, the outage probability (outage) of the base station B is higher than that of the base station A. After the adjustment to the coverage areas of the base stations, because the coverage area of the base station A is appropriately increased, the transmitting power of the base station A is correspondingly strengthened. At this time, the coverage area of the base station B is appropriately decreased, causing the load to be slightly reduced, but the electric power of the storage battery of the base station B is still unable to reduce the outage probability below the required threshold value. In order to meet the quality of service requirement within the coverage area, besides utilizing the electric power of the storage battery, the base station B also enables a power grid to supplement the power supply itself. Thus, although the power supplied by the storage battery is relatively low, the total transmitting power requirement of the base station B with the power supplies based on the storage battery and the power grid is guaranteed. As a result, it is guaranteed that the outage probabilities of the base station A and the base station B are basically the same, and moreover, the base station A and the base station B both can meet the qualities of services in the coverage areas.

Figure 4:
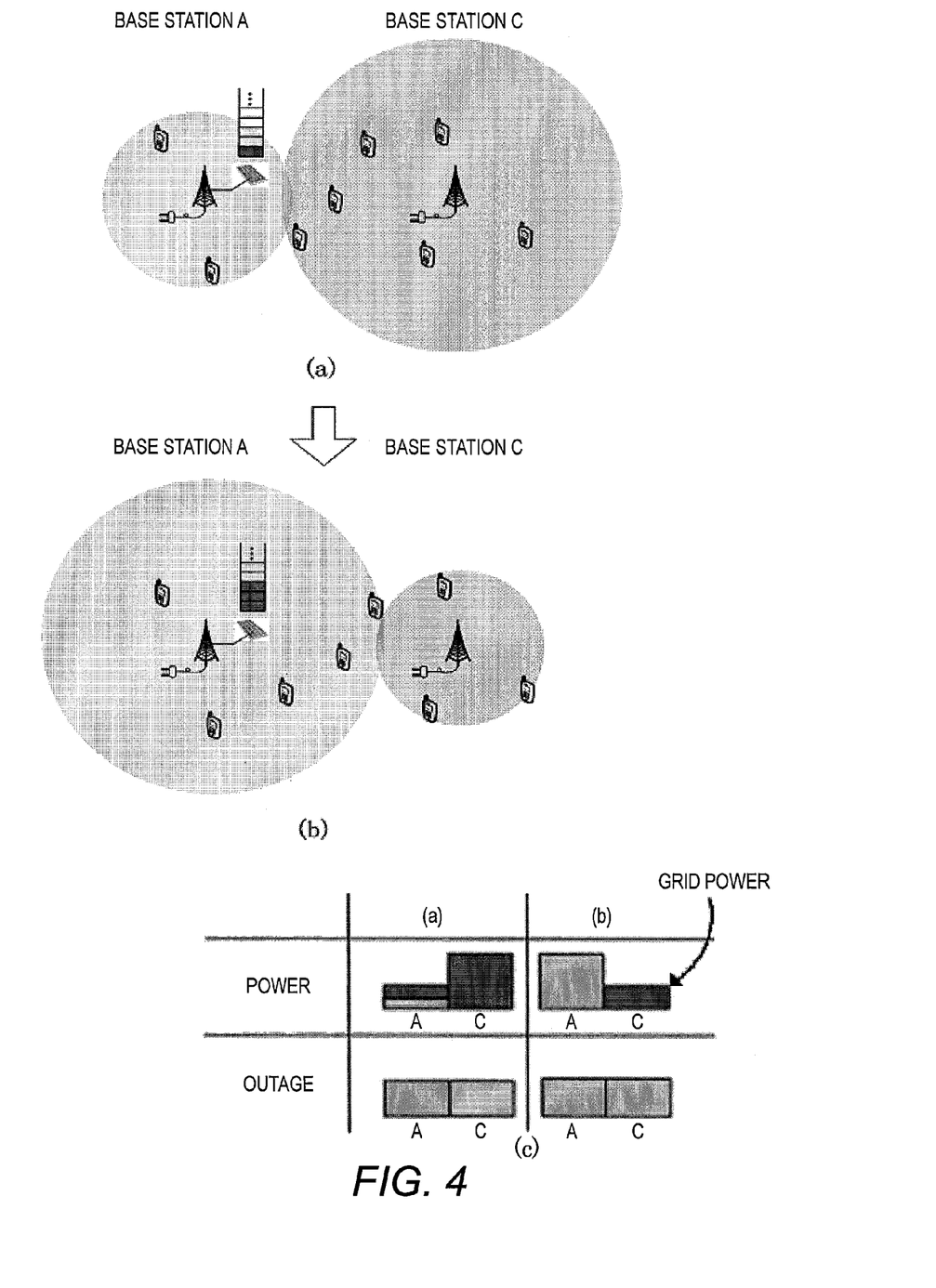
FIG. 4 is an explanatory diagram illustrating a principle of adjustment to the base station according to a fourth embodiment of this invention.

FIG. 4(a) and FIG. 4(b) illustrate a wireless cellular system including a renewable energy the base station A (may also be referred to simply as "base station A") and an ordinary base station C (may also be referred to simply as "base station C") only supplied with power by the power grid. In order to save energy consumption, it is desirable to maximize the utilization rate of the renewable energy, and the coverage area of each base station is therefore adjusted based on the electric power of the storage battery of the base station A.

FIG. 4(a) illustrates a state in which the storage battery of the base station A has an insufficient electric power. In this case, the base station A decreases its coverage area, and base station C increases its coverage area correspondingly. However, there also has a certain limitation to the coverage area of base station C (as determined by the total bandwidth, the maximum transmitting power, etc. of the base station itself), and the coverage area of base station C reaching its limit and can no longer be increased, and hence the base station A is required to enable the power grid to ensure the network coverage.

As illustrated in FIG. 4(c), in this state, besides utilizing the electric power of the storage battery, the base station A also enables the power grid to partially supply power to itself. Compared with base station C, the load of the base station A at this time is lighter, the coverage area is also smaller, and the total transmitting power is also weaker. Further, the base station A further enables the power grid to partially supply power to itself, and as a result, the outage probability of the base station A is basically the same as that of base station C, and moreover, the base station A and base station C both can meet the qualities of services in the coverage areas.

FIG. 4(b) illustrates a state in which the storage battery of the base station A has a sufficient electric power. In this case, the base station A increases its coverage, and utilizes the electric power of the storage battery as much as possible, while base station C can decrease its coverage, so as to reduce the energy consumption of the power grid.

As illustrated in FIG. 4(c), in this state, the base station A only utilizes the electric power of the storage battery. Compared with base station C, the base station A at this time has a heavier load, larger coverage area, and stronger total transmitting power. The outage probability of the base station A is therefore basically the same as that of base station C, and moreover, the base station A and base station C both can meet the qualities of services in the coverage areas.

Figure 5:
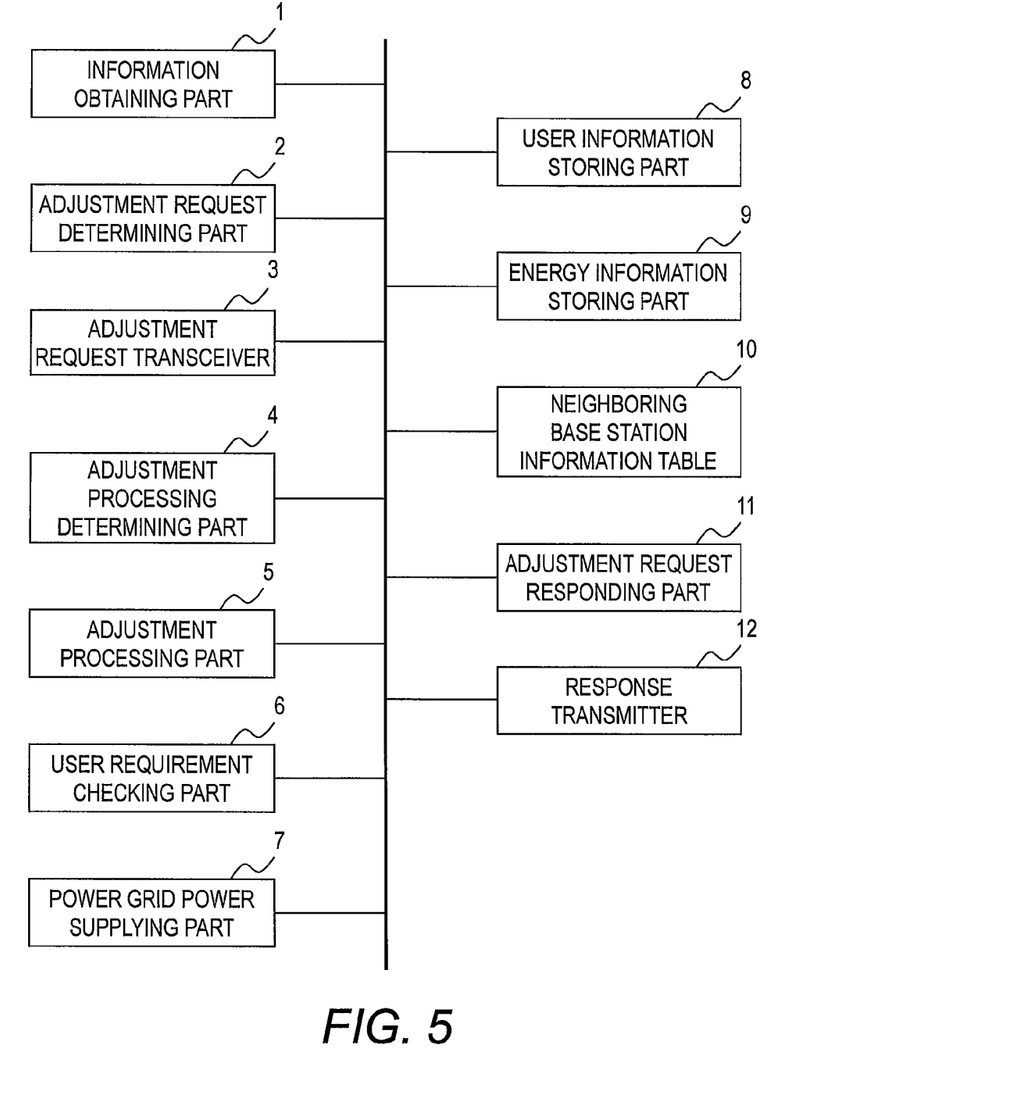
FIG. 5 is a diagram illustrating the functional configuration of a renewable energy base station.
Figure 6:
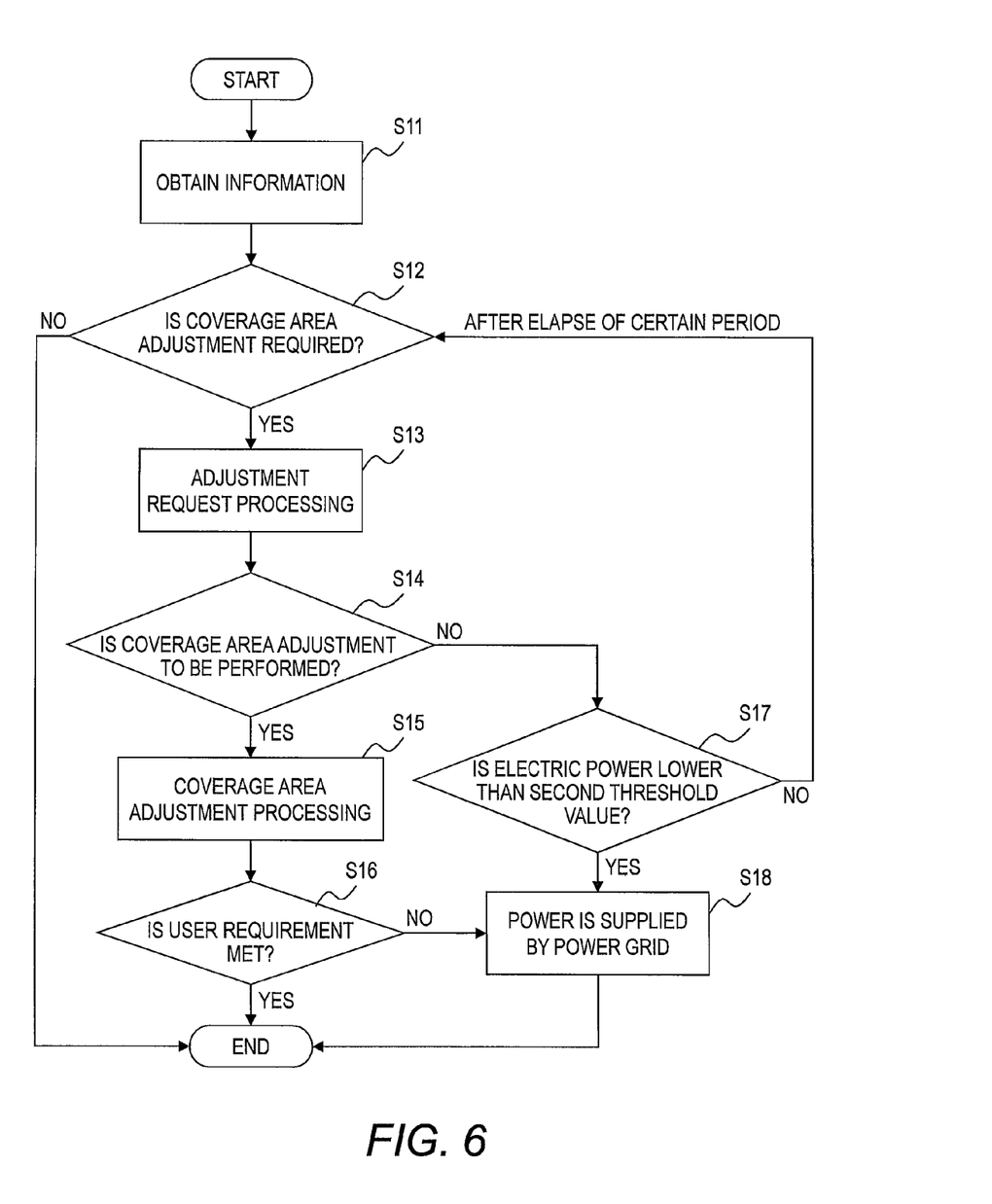
FIG. 6 is a flowchart illustrating the adjustment to the coverage area of a renewable energy base station.

FIG. 5 is a diagram illustrating the functional configuration of a renewable energy base station of this invention. FIG. 6 is a flowchart illustrating the adjustment to the coverage area of a renewable energy base station.

As illustrated in FIG. 5, the renewable energy base station of this invention includes an information obtaining part 1, an adjustment request determining part 2, an adjustment request transceiver 3, an adjustment processing determining part 4, an adjustment processing part 5, a user requirement checking part 6, a power grid power supplying part 7, a user information storing part 8, an energy information storing part 9, a neighboring base station information table 10, an adjustment request responding part 11, and a response transmitter 12.

As illustrated in FIG. 6, firstly, the information obtaining part 1 of a local base station obtains network resource usage information used by the users of the base station (i.e., user capacity information) from the user information storing part 8, and obtains storage battery electric power information of the local base station from the energy information storing part 9 (Step S11). The network resource usage information generally refers to the sum of the bandwidth requirements of the wireless devices connected to the base station. In certain circumstances, when the bandwidth requirement of each wireless device is the same, the number of the wireless devices connected can be regarded as the network resource usage information.

Then, the adjustment request determining part 2 determines whether an adjustment to the coverage area of the local base station is required based on the network resource usage information and the storage battery electric power information of the local base station obtained (Step S12).

Specifically, a first threshold value for determining whether the network resource is insufficient and a second threshold value for determining whether the electric power of the storage battery of the base station is insufficient may be predetermined, and under the condition that the amount of the network resource of the local base station used is higher than the first threshold value (e.g., the network resource occupied is higher than 80%) or the electric power of the storage battery of the local base station is lower than the second threshold value (e.g., the remaining electric power of the storage battery is lower than 10%), it is determined that an adjustment to the coverage area of the local base station is required. The first threshold value and the second threshold value can be specific numerical values with units, or ratios in the form of percentage, etc.

Further, the determination can also be made by calculating the outage probability. For example, when the outage probability Pout of the base station is larger than a predetermined third threshold value (e.g., Pout>1%), it is determined that an adjustment to the coverage area of the local base station is required.

When the adjustment request determining part 2 determines that an adjustment to the coverage area of the local base station is not required (Step S12, "NO"), the processing ends.

Normally, each of base stations has a neighboring base station information table 10, and updates the information of each of neighboring base stations through periodic information exchange. When the adjustment request determining part 2 determines that an adjustment to the coverage area of the local base station is required (Step S12, "YES"), the adjustment request transceiver 3 sends a coverage area adjustment request to each of neighboring base stations stored in the neighboring base station information table 10 and receives an adjustment request response from each of the neighboring base stations (Step S13). The processing after each of the neighboring base stations receives the coverage area adjustment request is described later with reference to FIG. 7 and FIG. 8.

Then, the adjustment processing determining part 4 determines whether the coverage area can be adjusted (Step S14). The adjustment request responses can be divided into two kinds of responses, specifically, a positive response allowing the adjustment to the coverage area and a negative response denying the adjustment to the coverage area, and the positive response includes at least the network resource usage information that can be provided by the neighboring base station.

Under the condition that the number of neighboring base stations allowing the adjustment request is a predetermined number or more (e.g., two or more) (Step S14, "YES"), the adjustment processing part 5 determines an adjustment amount of the coverage area of the local base station and an adjustment amount of the coverage area of each of the neighboring base stations, and collaborates with each of the neighboring base stations to carry out the adjustment processing to the coverage area of the base stations (Step S15). Detailed operations of the adjustment processing part 5 of the local base station and each of the neighboring base stations are described later with reference to FIG. 9.

Next, after the coverage area adjustment processing is completed, the user requirement checking part 6 determines whether the coverage area (transmitting power) after the adjustment processing can meet the user requirement (Step S16). Under the condition that it is determined that the user requirement can be met (Step S16, "YES"), the processing ends. Under the condition that it is determined that the user requirement is not met (Step S16, "NO"), the power grid power supplying part 7 calculates the electricity demand except the power supplied by the storage battery, and supplies power from the power grid to the renewable energy base station based on the electricity demand (Step S18), and then the whole processing ends.

On the other hand, in Step S14, when the number of neighboring base stations allowing the adjustment request is less than the predetermined number (Step S14, "NO"), it is once again determined whether the electric power of the storage battery of the renewable energy base station is less than the above-mentioned second threshold value (Step S17). When the electric power of the storage battery of the renewable energy base station is less than the second threshold value, e.g., less than 20% of the total electric power of the storage battery (Step S17, "YES"), the power grid power supplying part 7 enables the power grid to supply power to the renewable energy base station (Step S18), and then the whole processing ends. On the other hand, when the electric power of the storage battery of the renewable energy base station is the second threshold value or more (Step S17, "NO"), then after a certain period, the processing following Step S12 is carried out again.

Figure 7:
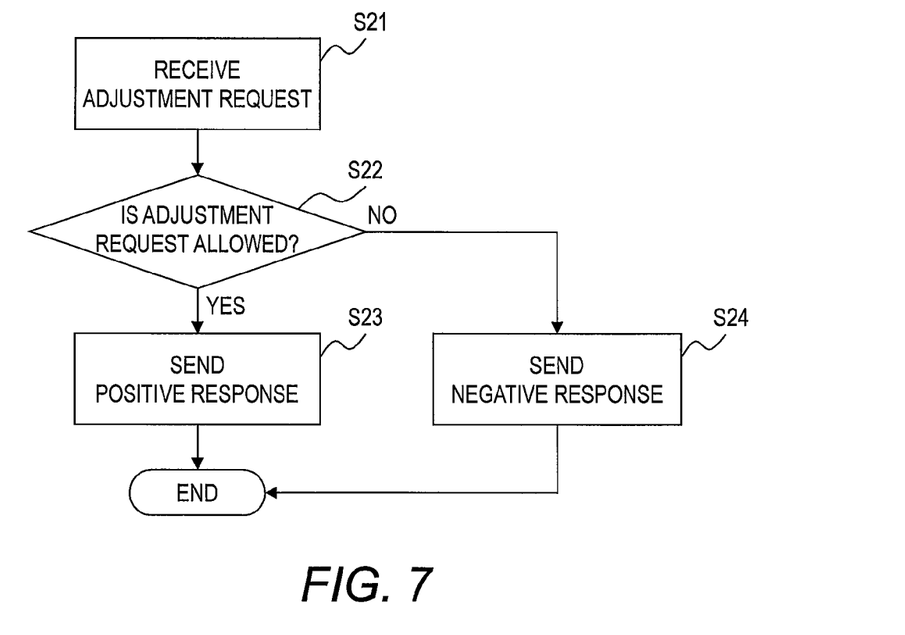
FIG. 7 is a flowchart illustrating processing of a renewable energy base station after receiving a coverage area adjustment request.

FIG. 7 is a flowchart illustrating processing of a renewable energy base station after receiving a coverage area adjustment request.

After receiving the coverage area adjustment request from a neighboring renewable energy base station (Step S21), the adjustment request responding part 11 of the renewable energy base station determines whether the coverage area adjustment request from the neighboring base station is allowed based on the network resource usage information and the storage battery electric power information of the local base station (Step S22).

Specifically, a fourth threshold value for determining whether the network resource is sufficient and a fifth threshold value for determining whether the electric power of the storage battery of the base station is sufficient can be predetermined, and under the condition that the amount of the network resource of the local base station used is smaller than the fourth threshold value (e.g., the network resource occupied is smaller than 60%) and the electric power of the storage battery of the local base station is larger than the fifth threshold value (e.g., the remaining electric power of the storage battery is larger than 50%), it is determined that the coverage area adjustment request from the neighboring base station is allowed. The fourth threshold value and the fifth threshold value can be specific numerical values, or ratios in the form of percentage, etc.

Under the condition that it is determined that the coverage area adjustment request is allowed (Step S22, "YES"), the response transmitter 12 sends a positive response allowing the coverage area adjustment (Step S23). The positive response includes at least the network resource usage information that can be provided by the neighboring base station. Under the condition that it is determined that the coverage area adjustment request is not allowed (Step S22, "NO"), the response transmitter 12 sends a negative response denying the coverage area adjustment (Step S24). The processing ends.

Figure 8:
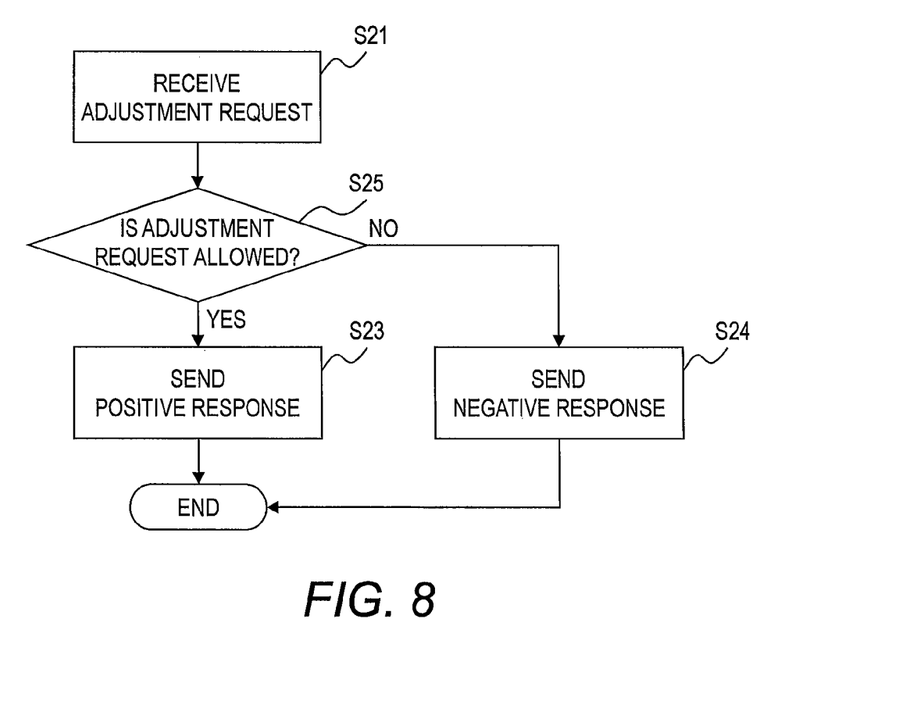
FIG. 8 is a flowchart illustrating processing of an ordinary base station after receiving a coverage area adjustment request.

FIG. 8 is a flowchart illustrating processing of an ordinary base station (base station that does not utilize renewable energy) after receiving a coverage area adjustment request.

Different from Step S22 of FIG. 7, in Step S25 of FIG. 8, the ordinary base station determines whether the coverage area adjustment request from the neighboring base station is allowed based on only the network resource usage information of the local base station. Other operations are the same as the operations of FIG. 7, and thus the repeated description is omitted herein.

Further, in order to improve the utilization rate of the renewable energy in the whole wireless cellular system, it is preferred that the renewable energy base station requesting the adjustment to the coverage area preferentially select a renewable energy base station(s) with sufficient electric power to carry out the subsequent operation of increasing the coverage area.

Figure 9:
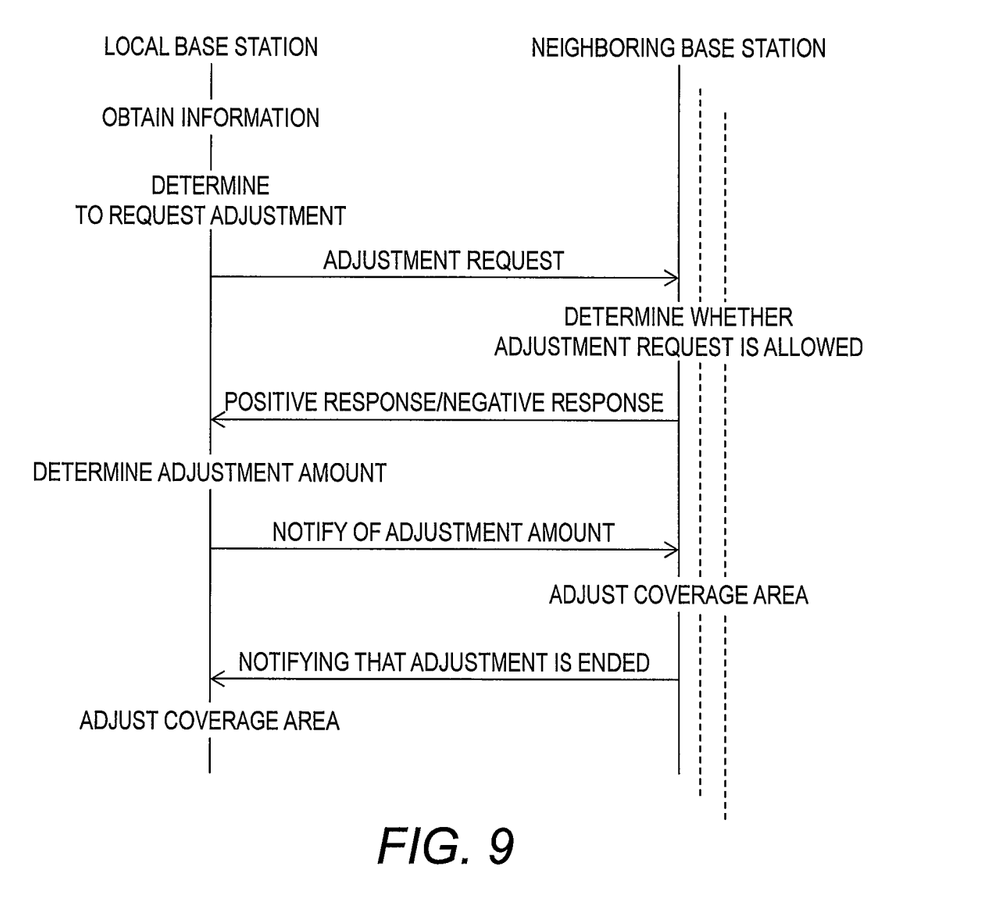
FIG. 9 is a sequence diagram illustrating a timing of an adjustment processing to the coverage area of the base station of a wireless cellular system.

FIG. 9 is a diagram illustrating the timing sequence of adjustment processing to the coverage area of the base station of a wireless cellular system. The operations of the adjustment processing part 5 of the local base station and each of the neighboring base stations are below described with reference to FIG. 9.

As illustrated in FIG. 9, the adjustment processing part 5 of the local base station determines an adjustment amount to the coverage area of the local base station and an adjustment amount to the coverage area of each of the neighboring base stations based on the network resource usage information each of the neighboring base stations is able to provide, and then sends the adjustment amount to the coverage area of each of the neighboring base stations to each of the neighboring base stations. For example, under the condition that four neighboring base stations each can provide a bandwidth of 10 M or more, the adjustment processing part 5 of the local base station determines to decrease the coverage area (transmitting power) of the local base station by an amount corresponding to the bandwidth of 40 M, and to increase the coverage area of each of four neighboring base stations by an amount corresponding to the bandwidth of 10 M, and notifies each of the neighboring base stations of the adjustment amount.

After receiving the respective adjustment amount, the adjustment processing part 5 of each of the neighboring base stations adjusts the respective coverage area based on the corresponding adjustment amount. After the adjustment to the coverage area is completed, each of the neighboring base stations notifies the local base station that the adjustment has been completed.

Then, after receiving the notifications that the adjustment has been completed from all of the neighboring base stations, the adjustment processing part 5 of the local base station adjusts the coverage area of the local base station, based on the adjustment amount to the coverage area of the local station as determined previously. The coverage area adjustment processing of the base stations including the local base station is thus completed.

Specifically, the adjustment processing part 5 determines the adjustment amount to the coverage area of the local base station and the adjustment amount to the coverage area of each of the neighboring base stations based on the obtained network resource usage information each of the neighboring base stations is able to provide, and then collaborates with each of the neighboring base stations to carry out the adjustment to the coverage area. For example, under the condition that four neighboring base stations each, can provide a bandwidth of 10 M or more, it is determined to decrease the coverage area (transmitting power) of the local base station by the amount corresponding to the bandwidth of 40 M, and to increase the coverage area of each of four neighboring base stations by the amount corresponding to the bandwidth of 10 M.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

For example, in addition to the network resource usage information each of the neighboring base stations is able to provide, the positive response in Step S23 described above may further include the storage battery electric power information of each of the neighboring base stations. When there are relatively more neighboring base stations sending the positive responses to the local base station, the neighboring base station(s) with more electric power can be selected to carry out the subsequent operation of increasing the coverage area based on the storage battery electric power information of each of the neighboring base stations received. In this manner, the electric power of the renewable energy can be utilized more reasonably.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A renewable energy base station, which is used in a wireless cellular system, comprising:
    an adjustment request determining part for determining whether an adjustment to a coverage area of the renewable energy base station is required based on at least one of network resource usage information of the renewable energy base station and storage battery electric power information of the renewable energy base station;
    an adjustment request transceiver, in a case where it is determined that the adjustment to the coverage area of the renewable energy base station is required, sending a coverage area adjustment request to neighboring base stations in the wireless cellular system, and receiving an adjustment request response from one or more of the neighboring base stations;
    an adjustment request responding part for determining whether the coverage area adjustment request from the one or more of the neighboring base stations is allowed based on at least one of the network resource usage information and the storage battery electric power information of the renewable energy base station in a case where receiving the coverage area adjustment request from one of the neighboring base stations; and
    a response transmitter for sending the adjustment request response to the neighboring base stations based on a result of the determination made by the adjustment request responding part,
    wherein the network resource usage information includes information indicating a used amount of a network resource of the renewable energy base station, and the storage battery electric power information includes information indicating a remaining electric power of the storage battery of the renewable energy base station, and
    in a case where the used amount of the network resource of the renewable energy base station is less than a predetermined first threshold value and the remaining electric power of the storage battery of the renewable energy base station is greater than a predetermined second threshold value, the adjustment request responding part determines that the coverage area adjustment request from the one of neighboring base stations is allowed.

2. The renewable energy base station according to claim 1, wherein at least one of a case where a network resource of the renewable energy base station is insufficient and a case where the electric power of the storage battery of the renewable energy base station is insufficient, the adjustment request determining part determines that the adjustment to the coverage area of the renewable energy base station is required.

3. The renewable energy base station according to claim 1, wherein:
    at least one of a case where the used amount of the network resource of the renewable energy base station is greater than a predetermined third threshold and a case where the remaining electric power of the storage battery of the renewable energy base station is less than a predetermined fourth threshold, the adjustment request determining part determines that the adjustment to the coverage area of the renewable energy base station is required.

4. The renewable energy base station according to claim 1, wherein the adjustment request determining part calculates an outage probability of the renewable energy base station based on the network resource usage information and the storage battery electric power information of the renewable energy base station, and determines that the adjustment to the coverage area of the renewable energy base station is required when the outage probability is greater than a predetermined fifth threshold value.

5. The renewable energy base station according to claim 1, wherein in a case where a network resource of the renewable energy base station is sufficient and the electric power of the storage battery of the renewable energy base station is sufficient, the adjustment request responding part determines that the coverage area adjustment request from the one of neighboring base stations is allowed.

6. The renewable energy base station according to claim 1, further comprising:
   an adjustment processing determining part for determining whether the coverage area is able to adjust based on the adjustment request response from the neighboring base stations; and
   an adjustment processing part for determining, in a case where it is determined that the coverage area is able to adjust, at least one of an adjustment amount to the coverage area of the renewable energy base station and an adjustment amount to the coverage area of each of the neighboring base stations, and collaborating with the adjustment processing part of the neighboring base stations to perform adjustment processing to the coverage areas.

7. The renewable energy base station according to claim 6, wherein the adjustment processing part notifies the neighboring base stations of the determined adjustment amount to the coverage area of the each of the neighboring base stations, and decreases the coverage area of the renewable energy base station based on the determined adjustment amount to the coverage area of the renewable energy base station after the coverage area of the each of the neighboring base stations is increased based on the received adjustment amount to the coverage area of the each of the neighboring base stations.

8. The renewable energy base station according to claim 6, wherein the adjustment processing part increases the coverage area of the renewable energy base station based on the adjustment amount to the coverage area of the renewable energy base station received from the neighboring base stations.

9. A coverage adjustment method for a renewable energy base station, which is performed in a wireless cellular system including a renewable energy base station, the coverage adjustment method including:
   an adjustment request determining step of determining, by the renewable energy base station, whether an adjustment to a coverage area of the renewable energy base station is required based on at least one of network resource usage information of the renewable energy base station and storage battery electric power information of the renewable energy base station;
   an adjustment request receiving and sending step of, in a case where it is determined that the adjustment to the coverage area of the renewable energy base station is required, the renewable energy base station sending a coverage area adjustment request to neighboring base stations in the wireless cellular system and receiving an adjustment request response from one or more of the neighboring base stations;
   an adjustment processing determining step of determining, by the renewable energy base station, whether the coverage area is able to adjust based on the adjustment request response from the one or more neighboring base stations;
   an adjustment processing step of determining, by the renewable energy base station, in a case where it is determined that the coverage area is able to adjust, at least one of an adjustment amount to the coverage area of the renewable energy base station and an adjustment amount to the coverage area of the neighboring base stations, and collaborating with the neighboring base stations to perform adjustment processing to the coverage areas,
   an adjustment request responding step of determining, by the each of the neighboring base stations whether the coverage area adjustment request from the renewable energy base station is allowed based on the network resource usage information and the storage battery electric power information of the each of the neighboring base stations in a case of receiving the coverage area adjustment request from the renewable energy base station; and
   a response sending step of sending, by each of the neighboring base stations, the adjustment request response to the renewable energy base station based on a result of the determination made in the adjustment request responding step,
   wherein the network resource usage information includes information indicating a used amount of a network resource of the base station, and the storage battery electric power information includes information indicating a remaining electric power of the storage battery of the base station, and
   wherein the adjustment request responding step includes a step of determining, by the each of the neighboring base stations, that the coverage area adjustment request from the one of neighboring base station is allowed in a case where the used amount of the network resource of the each of the neighboring base stations is less than a predetermined first threshold value and the remaining electric power of the storage battery of the each of the neighboring base stations is greater than a predetermined second threshold value.

10. The coverage adjustment method for a renewable energy base station according to claim 9, wherein the adjustment request determining step includes step of determining, by the renewable energy base station, that the adjustment to the coverage area of the renewable energy base station is required at least one of a case where a network resource of the renewable energy base station is insufficient and a case where the electric power of the storage battery of the renewable energy base station is insufficient.

11. The coverage adjustment method for a renewable energy base station according to claim 9, wherein:
   the adjustment request determining step includes a step of determining, by the renewable energy base station, that the adjustment to the coverage area of the renewable energy base station is required at least one of a case where the used amount of the network resource of the renewable energy base station is greater than a predetermined third threshold and in a case where the remaining electric power of the storage battery of the renewable energy base station is less than a predetermined fourth threshold.

12. The coverage adjustment method for a renewable energy base station according to claim 9, wherein the adjustment request determining step includes a step of calculating, by the renewable energy base station, an outage probability of the renewable energy base station based on the network resource usage information and the storage battery electric power information of the renewable energy base station, and determining that the adjustment to the coverage area of the renewable energy base station is required when the outage probability is greater than a predetermined fifth threshold value.

13. The coverage adjustment method for a renewable energy base station according to claim 9, wherein the adjustment request responding step includes a step of determining, by the each of the neighboring base stations, that the coverage area adjustment request from the renewable energy base station is allowed when a network resource of the each of the neighboring base stations is sufficient and the electric power of the storage battery of the each of the neighboring base stations is sufficient.

14. The coverage adjustment method for a renewable energy base station according to claim 9, wherein the adjustment processing step includes steps of:
   notifying, by the renewable energy base station, the neighboring base stations of the determined adjustment amount to the coverage area of the each of the neighboring base stations;
   increasing, by the each of the neighboring base stations, the coverage area of the each of the neighboring base stations based on the received adjustment amount to the coverage area of the each of the neighboring base stations; and
   decreasing, by the renewable energy base station, the coverage area of the renewable energy base station based on the determined adjustment amount to the coverage area of the renewable energy base station after the coverage area of the each of the neighboring base stations is increased.

\* \* \* \* \*